United States Patent
Inugai et al.

(10) Patent No.: US 7,965,469 B2
(45) Date of Patent: Jun. 21, 2011

(54) TAPE CARTRIDGE AND TAPE LOADING SYSTEM USING SAME

(75) Inventors: Yasuo Inugai, Ibaraki (JP); Hideyuki Tanaka, Ibaraki (JP); Masashi Adachi, Ibaraki (JP)

(73) Assignee: Hitachi Maxwell, Ltd., Ibaraki-shi, Osaka (JP)

( * ) Notice: Subject to any disclaimer, the term of this patent is extended or adjusted under 35 U.S.C. 154(b) by 956 days.

(21) Appl. No.: 11/878,432

(22) Filed: Jul. 24, 2007

(65) Prior Publication Data

US 2008/0024916 A1    Jan. 31, 2008

(30) Foreign Application Priority Data

Jul. 25, 2006    (JP) .................... 2006-201706

(51) Int. Cl.
    *G11B 5/41*    (2006.01)
(52) U.S. Cl. ............... 360/128; 360/130.33; 242/348
(58) Field of Classification Search .......... 360/128, 360/130.21, 130.31, 130.3, 130.33; 242/348, 242/348.2, 348.3
    See application file for complete search history.

(56) References Cited

U.S. PATENT DOCUMENTS

| | | | | |
|---|---|---|---|---|
| 5,453,894 A | * | 9/1995 | Kim et al. | 360/128 |
| 5,463,519 A | * | 10/1995 | Dodt et al. | 360/128 |
| 5,930,089 A | * | 7/1999 | Anderson | 360/128 |
| 5,936,816 A | * | 8/1999 | Bloomquist et al. | 360/128 |
| 6,050,514 A | * | 4/2000 | Mansbridge | 242/332.7 |
| 6,067,212 A | * | 5/2000 | Poorman | 360/128 |
| 6,497,377 B2 | * | 12/2002 | Underkofler et al. | 242/332.8 |
| 6,678,118 B2 | * | 1/2004 | Tanaka et al. | 360/128 |
| 6,697,212 B2 | * | 2/2004 | Tsuchiya | 360/95 |
| 6,751,056 B1 | * | 6/2004 | Anderson et al. | 360/128 |
| 6,867,947 B2 | * | 3/2005 | Davis | 360/128 |
| 6,945,488 B2 | * | 9/2005 | Shimanuki et al. | 242/332.4 |
| 7,372,668 B2 | * | 5/2008 | Tsuneyoshi et al. | 360/128 |
| 7,688,547 B2 | * | 3/2010 | Tanaka | 360/128 |
| 2002/0044382 A1 | * | 4/2002 | Brong | 360/128 |
| 2008/0024916 A1 | * | 1/2008 | Inugai et al. | 360/130.21 |

FOREIGN PATENT DOCUMENTS

| | | |
|---|---|---|
| JP | 4-216314 A | 8/1992 |
| JP | 7-105558 A | 4/1995 |
| JP | 8-63718 A | 3/1996 |
| JP | 2002-203308 A | 7/2002 |
| JP | 2002-367127 A | 12/2002 |

OTHER PUBLICATIONS

Japanese Office Action issued on Oct. 27, 2010 in corresponding Japanese Patent Application No. 2007-158245.

* cited by examiner

*Primary Examiner* — Brian E Miller
(74) *Attorney, Agent, or Firm* — Birch, Stewart, Kolasch & Birch, LLP

(57) ABSTRACT

There are provided a tape cartridge which can reliably remove contamination adhering to the surface of a head and a tape loading system using the same. A tape such as recording tapes and leader tapes is unreeled from a case body housing the tape and is taken up to the take up reel of a tape drive through a loading path of the tape drive. A brush which can bend elastically is placed on a leading end side of the tape in a protruding manner. The brush moves in the state of being in contact with a head placed along the loading path of the tape drive upon unreeling of the tape, so that the head of the tape drive is cleaned by the brush.

3 Claims, 8 Drawing Sheets

TAPE CARTRIDGE AND TAPE LOADING SYSTEM USING SAME

BACKGROUND OF THE INVENTION

The present invention relates to a tape cartridge, in the state of being mounted on a tape drive as an external unit for use in computers and the like, in which a tape unreeled from a case body is taken up by a take up reel of an external unit through a loading path in the external unit, and to a tape loading system using the same.

A single reel-type tape cartridge is disclosed in JP 8-63718 A (FIG. 1), in which one reel with a recording tape wound therearound is housed in a case body and a cleaning section such as cleaning tapes is placed at a leading end section of the recording tape.

The tape drive is equipped with a head for reading data recorded on the recording tape, or for recording data on the recording tape. In JP 8-63718 A (FIG. 1), when the recording tape is unreeled from the case body and loaded onto a take up reel in the tape drive, the cleaning tape or the like slides in the state of being in contact with the surface of the head so as to remove contamination adhering to the surface of the head.

As shown in FIG. 3 in JP 2002-203308 A for example, the head may have a recess section on its surface for the purpose of, for example, releasing the air entrapped between the recording tape and the head. In this case, reliable removal of the contamination invaded inside the recess section may not be achieved by the cleaning tape and the like.

The cleaning section in JP 8-63718 A (FIG. 1) is formed by applying abrasive to a leader tape coupled to the leading end of the recording tape, or fixing a cleaning tape between the recording tape and the leader tape, which causes a problem that the cleaning section deteriorated by use cannot be replaced easily.

SUMMARY OF THE INVENTION

The object of the present invention is to provide a tape cartridge which can reliably remove contamination adhering to the surface of the head of an external unit and a tape loading system using the same.

A tape cartridge targeted by the present invention is structured so that a tape is unreeled from a case body housing the tape, and is taken up by a take up reel of an external unit through a loading path of the external unit. The tape herein corresponds to recording tapes (magnetic tapes) which can magnetically record signals and then magnetically read them, and recording tapes which can record signals using optical systems such as lasers and then read them magnetically or using optical systems. The tape may include an unrecordable leader tape placed on the leading end side of the recording tape and a cleaning tape, or the entire tape may be a cleaning tape. Such a tape may or may not come into contact with the head of an external unit. The loading path corresponds to the path traveling from the case body of a tape cartridge to a take up reel in an external unit. The signals correspond to signals including digital data signals and analog signals.

There is provided a tape cartridge in the present invention, including a cleaning member which can bend elastically and which is placed on a leading end side of the tape in a protruding manner and, wherein the cleaning member moves in a state of being in contact with a head placed along a loading path 33 of an external unit upon unreeling of the tape, so that the head is cleaned. The cleaning member includes cleaning members of a brush-type and of a spatula-type (plate-type). The head includes heads (magnetic heads) which can magnetically record signals onto the recording tape and which can read magnetically recorded signals therefrom, and heads (optical heads) which can record signals onto the recording tape using an optical system constituted of a laser or an optical lens, and which can read signals, which were recorded by using the optical system, with use of a light receiving element and the like. The head includes those composed of a head for recording signals onto the recording tape and a head for reading signals from the recording tape, and those constituted of one head which singlehandedly records signals onto the recording tape and reads signals from the recording tape.

More specifically, the tape cartridge of the present invention may be structured so that one reel is housed in a case body with a tape being wound around the reel, the tape being a recording tape from which a signal is read by the head, or onto which a signal is recorded by the head.

The leading end side of the tape is connected to a leader block which is captured by a capture means of the external unit and is pulled out of the case body, and the cleaning member is placed in the leader block. The cleaning member may be placed in the leader block in the state of being generally vertical to the unreeled direction of the tape or in the state of being inclined thereto.

More specifically, the cleaning member is fixed to a base section which is detachably attached to the leader block. Such a cleaning member may be a brush having elasticity.

A leader tape may be connected to the leading end of the recording tape, and the cleaning member may be placed between the leading end of the recording tape and the leader tape. The leading end of the recording tape may be an unrecordable section, and may be constituted of a cleaning tape and the like. In terms of productivity, it is preferable that a leader tape 5, the leading end of the recording tape and the cleaning member should be connected integrally with a splicing tape.

A tape loading system targeted by the present invention in which a tape unreeled from a tape cartridge is taken up by a take up reel through a loading path, characterized in that a cleaning member which can bend elastically and which is placed on a leading end side of the tape in a protruding manner, moves towards the take up reel through the loading path upon unreeling of the tape from the tape cartridge, so that the cleaning member comes into contact with a head placed along the loading path and thereby cleans the head 20.

According to the present invention, the cleaning member projected on the leading end side of the tape moves in the state of being in elastic contact with the head of an external unit, so that even if the head has extrusions and indentions, the cleaning member can enter in the indentions and scrape off the contamination. Therefore, it becomes possible to achieve reliable removal of the contamination adhering to the head, thereby ensuring prevention of, for example, failure of data signal readout and failure of data signal recording (writing) attributed to contamination of the head. Furthermore, since the cleaning member comes into elastic contact with the head, the head is rarely ground like the cleaning tape, and therefore the exhaustion of the head is proportionally reduced, which makes it possible to prevent the life of the head from being shortened.

Even if a clearance is present between the head and the leading end side of the tape, a projected portion of the cleaning member ensures the contact of the cleaning member with the head, thereby allowing reliable removal of the contamination adhering to the head.

Such a cleaning member can suitably be applied to the tape cartridge in which a recording tape is wound around one reel housed in the case body, and in that case, it becomes possible to reliably prevent failure, such as failure of readout of data signals and the like from the recording tape and failure of recording of data signals and the like onto the recording tape attributed to the contamination of the head.

If the cleaning member is placed in the leader block 6, the head can be cleaned with effective use of the leader block. Therefore, it is not necessary to shorten the recording tape for the sake of the cleaning tape as in the cleaning tape in JP 8-63718 A (FIG. 1), so that reduction in storage capacity due to the shortening of the recording tape can be prevented.

If the cleaning member becomes attachable to and detachable from the leader block by being fixed to the base section, the cleaning member can easily be replaced with a new cleaning member when, for example, the cleaning member is damaged by prolonged use. Therefore, even if the tape cartridge is used over a long period of time, the cleaning function of the head during the time period can certainly be maintained.

If the cleaning member is a brush having elasticity, it becomes possible to reliably clean minute extrusions and indentions of the head with the brush.

If the cleaning member is placed between the leading end of the recording tape and the leader tape, the cleaning member can easily be added to conventional tape cartridges, so that the time and effort for improving manufacturing apparatuses can proportionally be reduced.

If the leader tape 5, the leading end of the recording tape and the cleaning member are integrally connected with a splicing tape, the time and effort in the manufacturing process can be reduced compared to the case of connecting these components independently.

In a tape loading system using the tape cartridge implementing these effects, only unreeling a tape from the tape cartridge and taking up the tape onto a take up reel through a loading path, or rewinding the tape taken up by the take up reel into the tape cartridge enable the cleaning member to reliably clean the minute extrusions and indentions of the head. Therefore, disassembly of the loading path and the like for cleaning of the head can be spared, and therefore the time and effort in maintenance of the tape loading system are proportionally reduced. Furthermore, since the cleaning member comes into elastic contact with the head as described above, it becomes possible to reduce exhaustion of the head and to thereby prevent the life of the head from being shortened.

BRIEF DESCRIPTION OF THE DRAWINGS

The present invention will be further described with reference to the accompanying drawings wherein like reference numerals refer to like parts in the several views, and wherein.

DETAILED DESCRIPTION OF THE PREFERRED EMBODIMENTS

Embodiment 1

Figure 1:
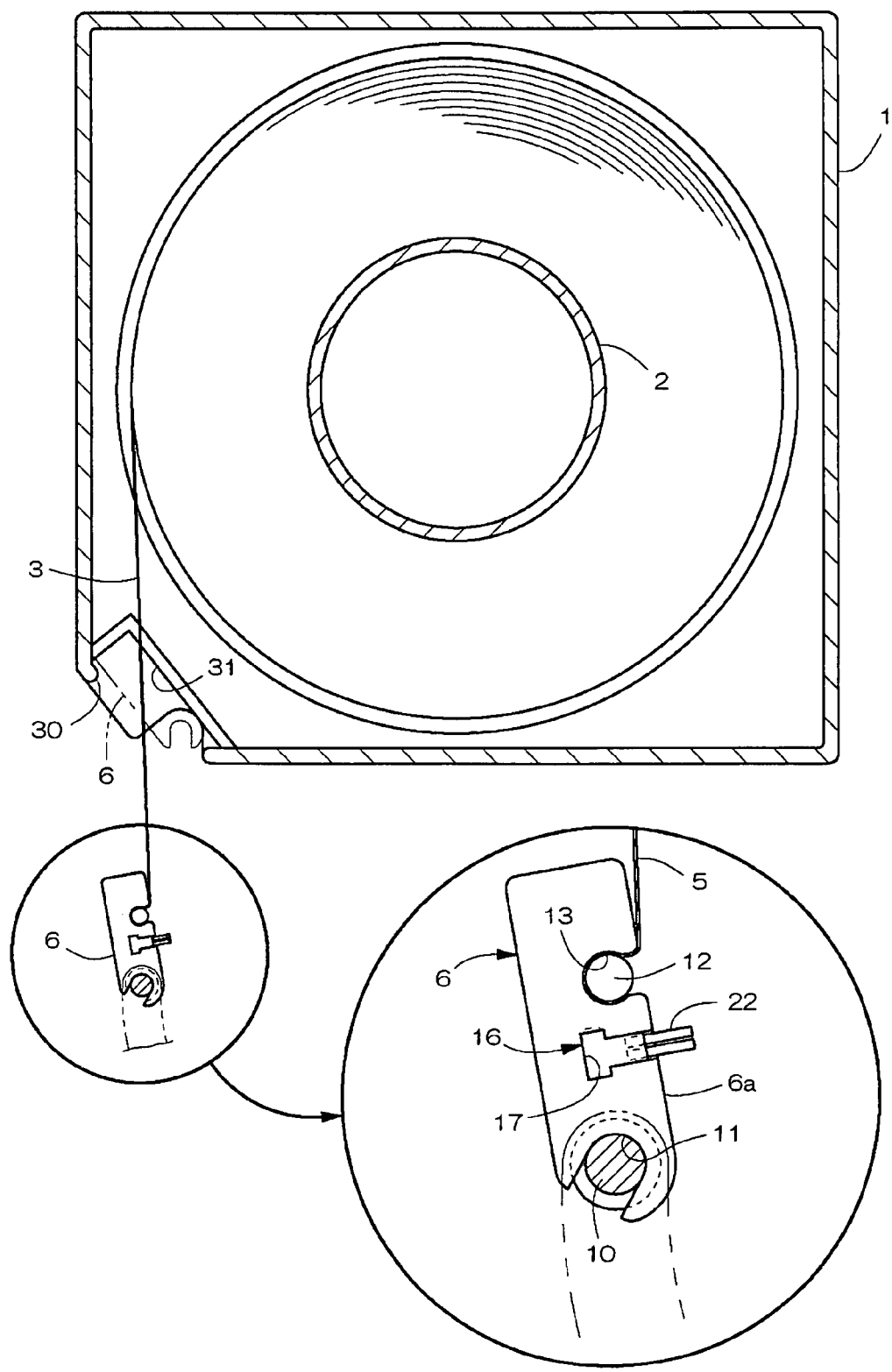
FIG. 1 is a transverse cross sectional view of a tape cartridge in an embodiment 1 of the present invention.

FIGS. 1 through 4 show an embodiment 1 of a tape cartridge targeted by the present invention. As shown in FIG. 1, the tape cartridge is formed into a single reel-type tape cartridge having a case body 1 in a square box shape, which is formed by combining square-shaped upper and lower casings in a lid coupling state, one reel 2 housed in the case body 1, and a recording tape 3 which is wound around the reel 2 and housed in the case body 1. The recording tape 3 includes a magnetic tape onto which signals can be recorded magnetically using a magnetic head and from which the signals can then be read magnetically by the magnetic head, and a tape onto which signals can be recorded by an optical head using a laser and the like and from which the signals can then be read magnetically or optically by a magnetic head or an optical head. Digital data signals and analog signals can be recorded onto the recording tape 3.

Figure 2:
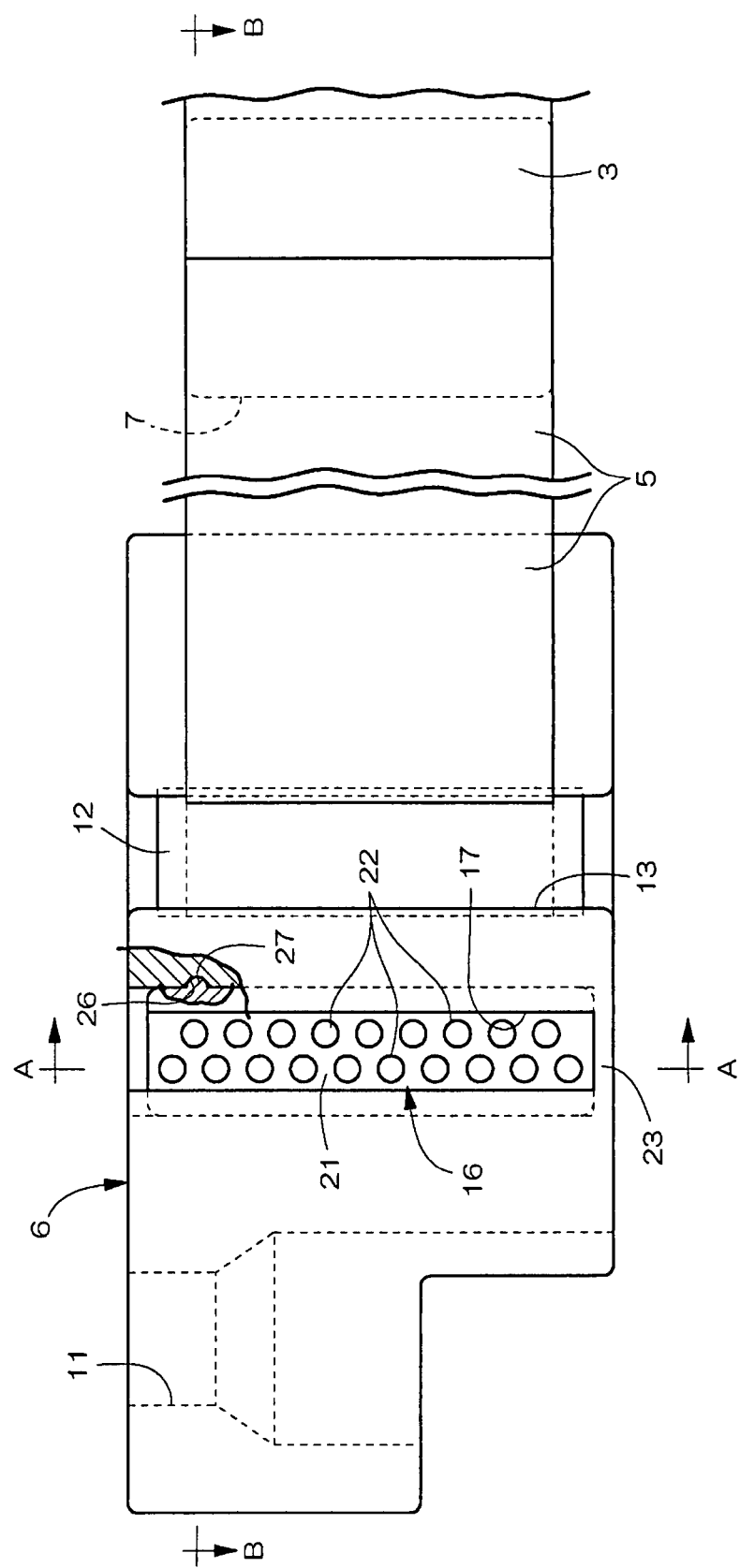
FIG. 2 is a side view of a leader block of the embodiment 1.

The recording tape 3 is unreeled from the case body 1, and a leader block 6 is connected to the leading end side of the recording tape 3 via a leader tape 5 (see FIG. 2). The leader tape 5, which is formed from a material such as polyester sheets having a width identical to that of the recording tape 3, is coupled to the recording tape 3 via a splicing tape 7. It is to be noted that signals cannot be recorded onto the leader tape 5.

Figure 5:
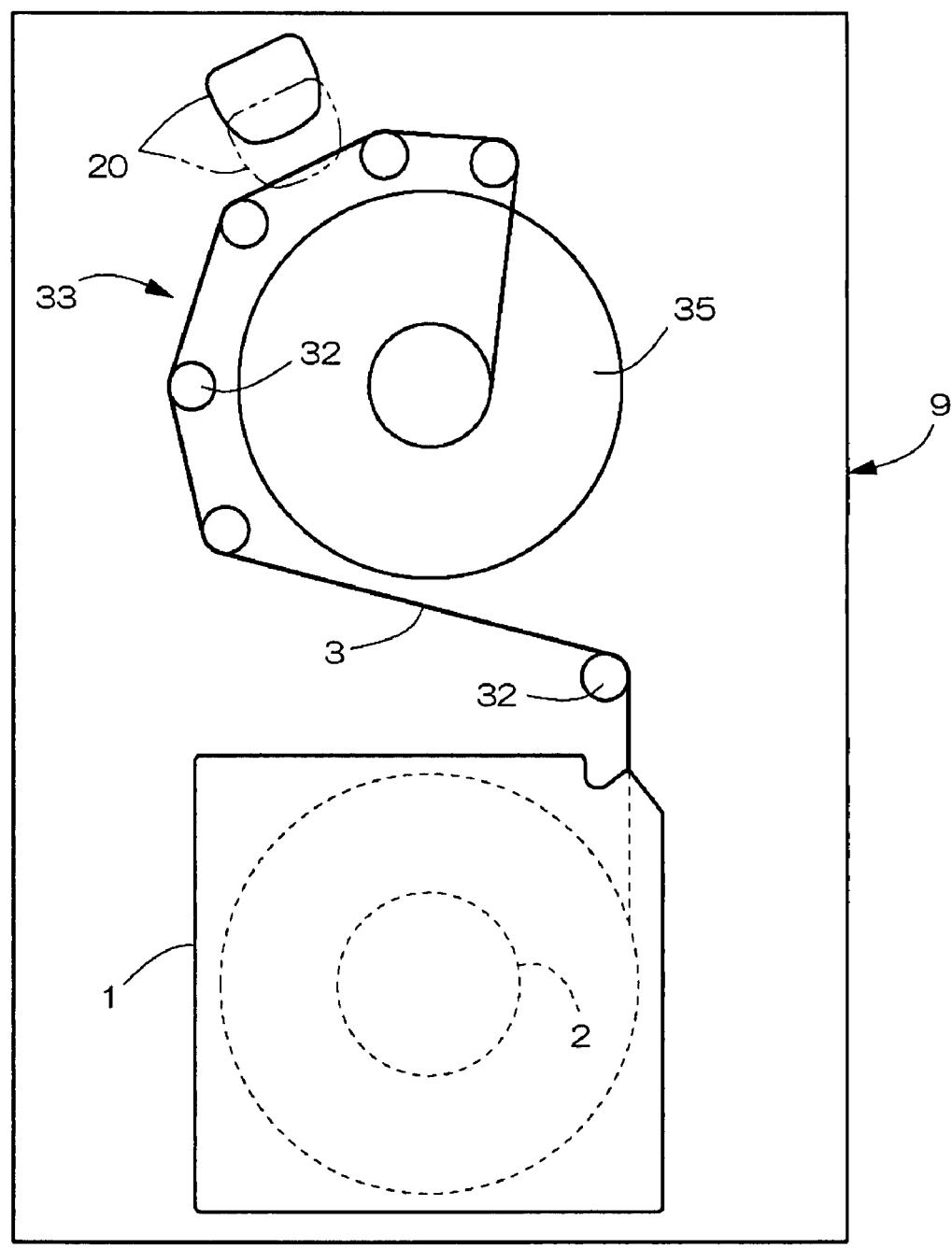
FIG. 5 is a schematic structure view of a tape drive with a tape loaded thereon.

As shown in FIGS. 1 through 4, the leader block 6 is constituted of a plastic molding in a generally rectangular parallelepiped shape, with a connection groove 11 having a U-shaped cross-section formed in a top end part for establishing engaged connection to a capture pin (capture means) 10 of a tape drive (external unit) 9 shown in FIG. 5. The leader block 6 is pulled out of the case body 1 by being captured by the capture pin 10 of the tape drive 9.

On the right lateral face 6a (lower side in FIG. 4) of the leader block 6, there is an engagement groove 13 for fixing the leading edge of the leader tape 5 with a fast pin 12 in its starting end part, while there is a fitting groove 17 having a T-shaped cross-section for detachably attaching a cleaning body 16 for head cleaning in a top end part of the right lateral face 6a.

The cleaning body 16, which is for removing and cleaning contamination such as dust adhering to the surface of the head 20 in the tape drive 9, has a shaft section (base section) 21 having a T-shaped cross section which detachably fits in the fitting groove 17 of the leader block 6 and is mounted therein, and a brush (cleaning member) 22 formed by transplanting hair and fixing it on the outer edge surface of the shaft section 21. The brush 22 has elasticity.

When the cleaning object 16 is mounted in the fitting groove 17 of the leader block 6, the brush 22 is to be placed in the leader block 6 in a protruding manner, so that in this state, the brush 22 can face the head 20 of the tape drive 9. The shaft section 21 is made of a plastic molding extending longer in the width direction of the leader tape 5 as shown in FIG. 2. The linear dimension of the shaft section 21 is longer than the width dimension of the leader tape 5.

The brush 22 of the cleaning body 16 is made of a material such as conductive fine polyester fibers and silk threads, which can bend elastically and have flexibility to some extent, and is presented in the state of being divided in a plurality of bundles. The bundles of the brush 22 are aligned in two rows in the length direction of the shaft section 21 over the whole region of the length direction of the shaft section 21.

Figure 3:
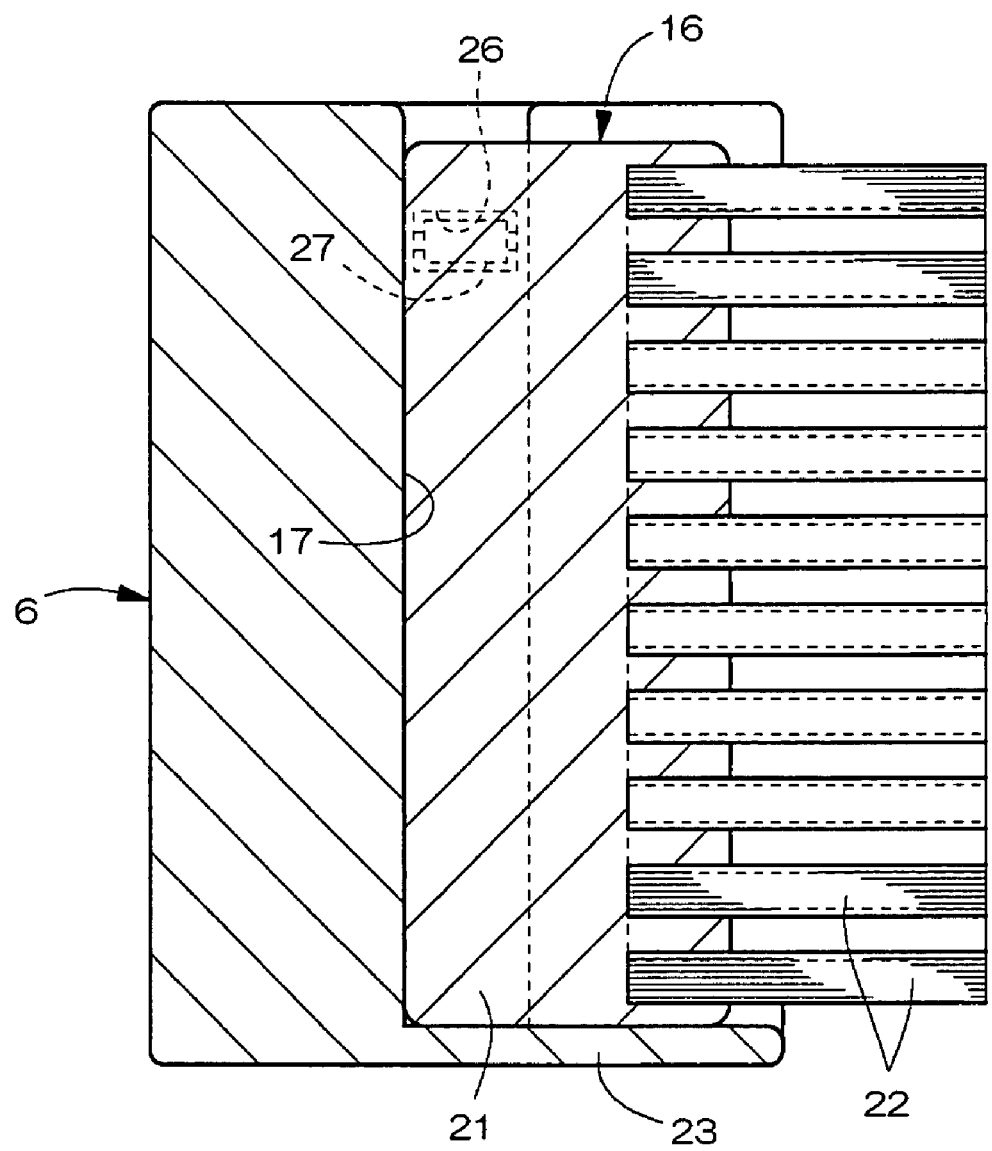
FIG. 3 is a cross sectional view taken along line A-A in FIG. 2.
Figure 4:
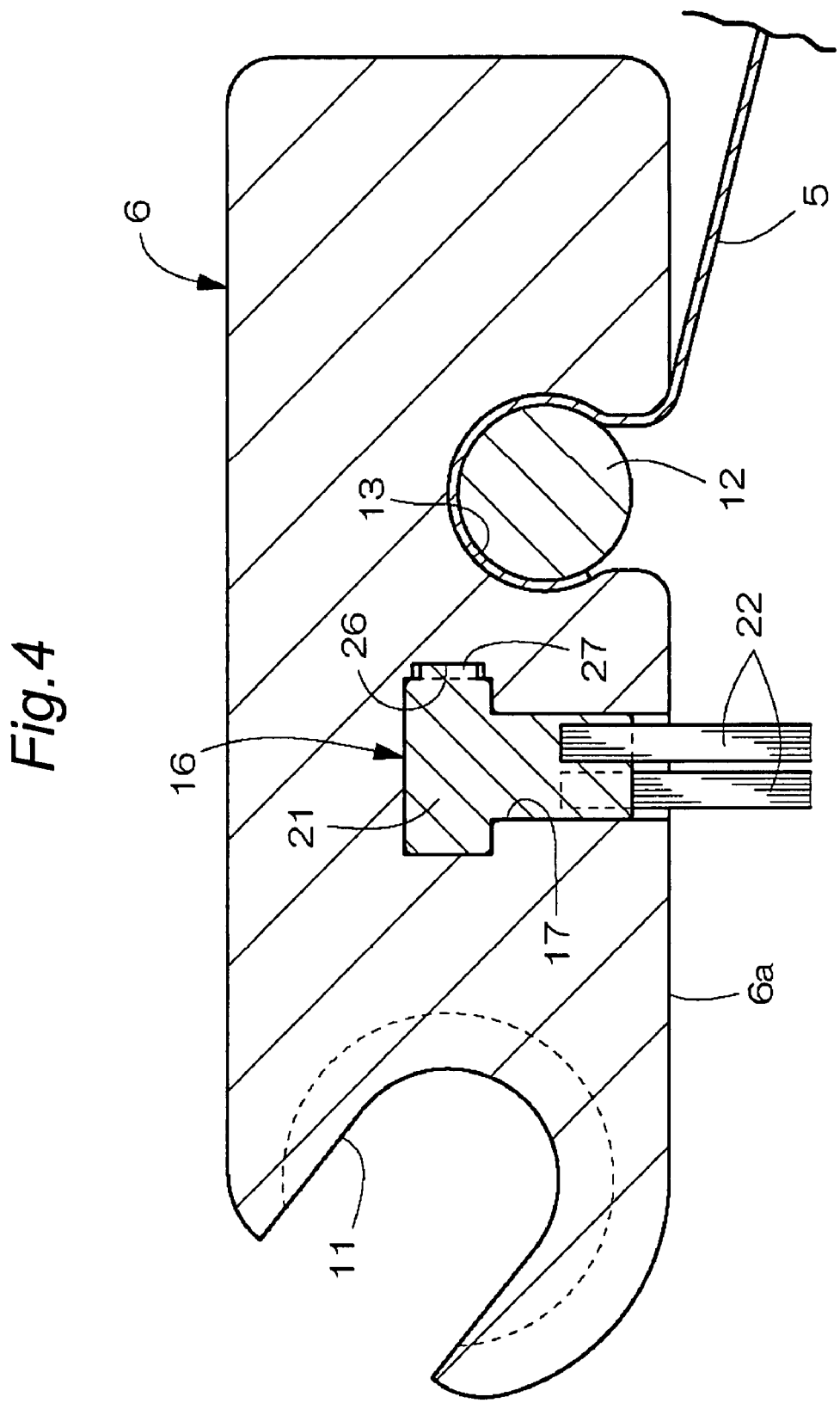
FIG. 4 is a cross sectional view taken along line B-B in FIG. 2.

As shown in FIGS. 2 and 3, the fitting groove 17 of the leader block 6 extends in the width direction of the leader tape 5 with one end side (upper side in FIG. 3) in the width direction being open while the other end side (lower side in FIG. 3) being closed by a regulation wall 23. A fitting recess 26 is provided in a part of the one end side of the fitting groove 17, and an engaging projection 27 provided in the shaft section 21 of the cleaning body 16 fits in the fitting recess 26. The fitting prevents the cleaning body 16 from falling out of the fitting groove 17 of the leader block 6.

As shown in FIG. 1, a tape outlet 30 is opened to the left corner section on the front side of the case body 1, and a seat 31 for retaining the leader block 6 in a standby position (position shown by a two-dot chain line in FIG. 1) at the time of non-use is provided inside the tape outlet 30. At the time of the non-use, the reel 2 is locked by an unshown reel lock mechanism, which prevents the reel 2 from idling.

Description is now given of an embodiment of a tape loading system using the tape cartridge. As shown in FIG. 5, upon loading the tape cartridge onto the tape drive 9, the capture pin 10 of the tape drive 9 engages with the connection groove 11 of the leader block 6 in the tape cartridge (see FIG. 6), and the locked state of the reel 2 by the reel lock mechanism in the tape cartridge is canceled. Next, in order to unreel the recording tape 3 from the tape cartridge for loading, the leader block 6 is drawn out by the capture pin 10 from the case body 1 together with the leader tape 5 and the recording tape 3, and the leader tape 5 and the recording tape 3 are taken up by a take up reel 35 through a loading path 33 which is composed of guide rollers 32 and the like (state in FIG. 5).

Figure 6:
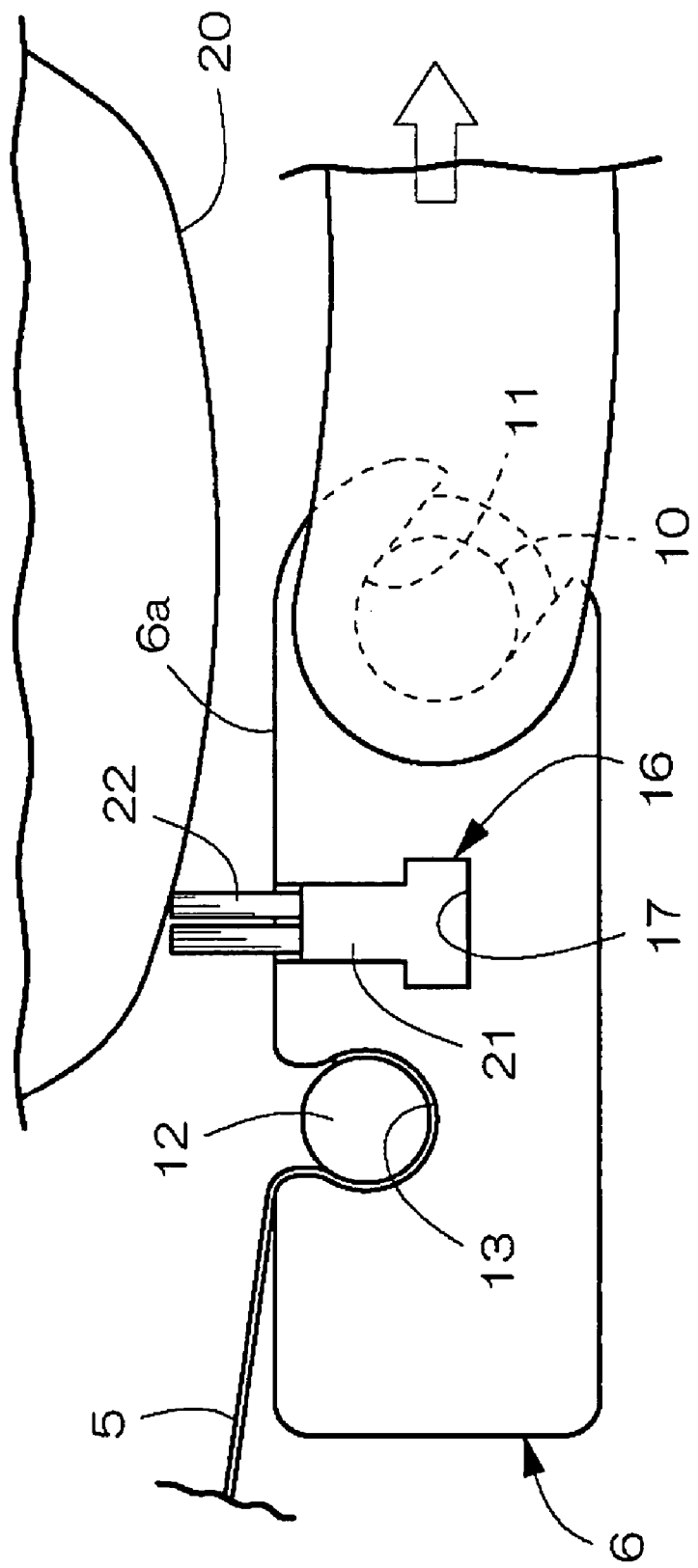
FIG. 6 is a plan view for explaining the operation of the cleaning member of the embodiment 1.

The head 20 is placed along the loading path 33, and when the recording tape 3 comes into contact with the head 20, the data signals recorded on the recording tape 3 are read from the recording tape 3 by the head 20, or data signals are recorded on the recording tape 3 by the head 20. In the loading operation, before the recording tape 3 comes into contact with the head 20, the brush 22 of the cleaning body 16 slides in the state of being in contact with the surface of the head 20 as shown in FIG. 6, as a result of which the contamination on the surface of the head 20 is removed.

It is to be noted that in this loading system, also in the unloading operation in which the recording tape 3 is taken up by the reel 2 of the tape cartridge, the brush 22 of the cleaning body 16 slides in the state of being in contact with the surface of the head 20, as a result of which the contamination on the surface of the head 20 is removed. It is to be noted that the head 20 may read the data signals recorded on the recording tape 3, or record data signals on the recording tape 3 without coming into contact with the recording tape 3. The head 20 is constituted of a head such as magnetic heads and optical heads.

When the brush 22 of the cleaning object 16 is damaged by prolonged use, the cleaning body 16 is pushed to the one end side (upper side in FIG. 3) of the fitting groove 17 in the leader block 6 so that the engaging projection 27 of the cleaning body 16 is disengaged from the fitting recess 26 in the fitting groove 17, and the cleaning body 16 is extracted from the fitting groove 17.

Then, a new cleaning body 16 is inserted from the one end side of the fitting groove 17 and is pushed until the engaging projection 27 of the cleaning body 16 fits into the fitting recess 26 of the fitting groove 17 (state in FIG. 2). Thus, the new cleaning body 16 is mounted in the fitting groove 17 of the leader block 6.

The cleaning body 16 may be fixed to the leader block 6 with an adhesive bond, or may be fixed by other ways such as pressing the cleaning body 16 into the fitting groove 17 of the leader block 6. The brush 22 may be formed by direct hair transplantation on the right lateral face 6a of the leader block 6 and be fixed thereon. The leader tape 5 may be omitted and the leader block 6 may be directly connected to the leading end of the recording tape 3. The leading end of the recording tape 3 may be constituted of an unrecordable tape, and may be constituted of a cleaning tape and the like.

Embodiment 2

Figure 7:
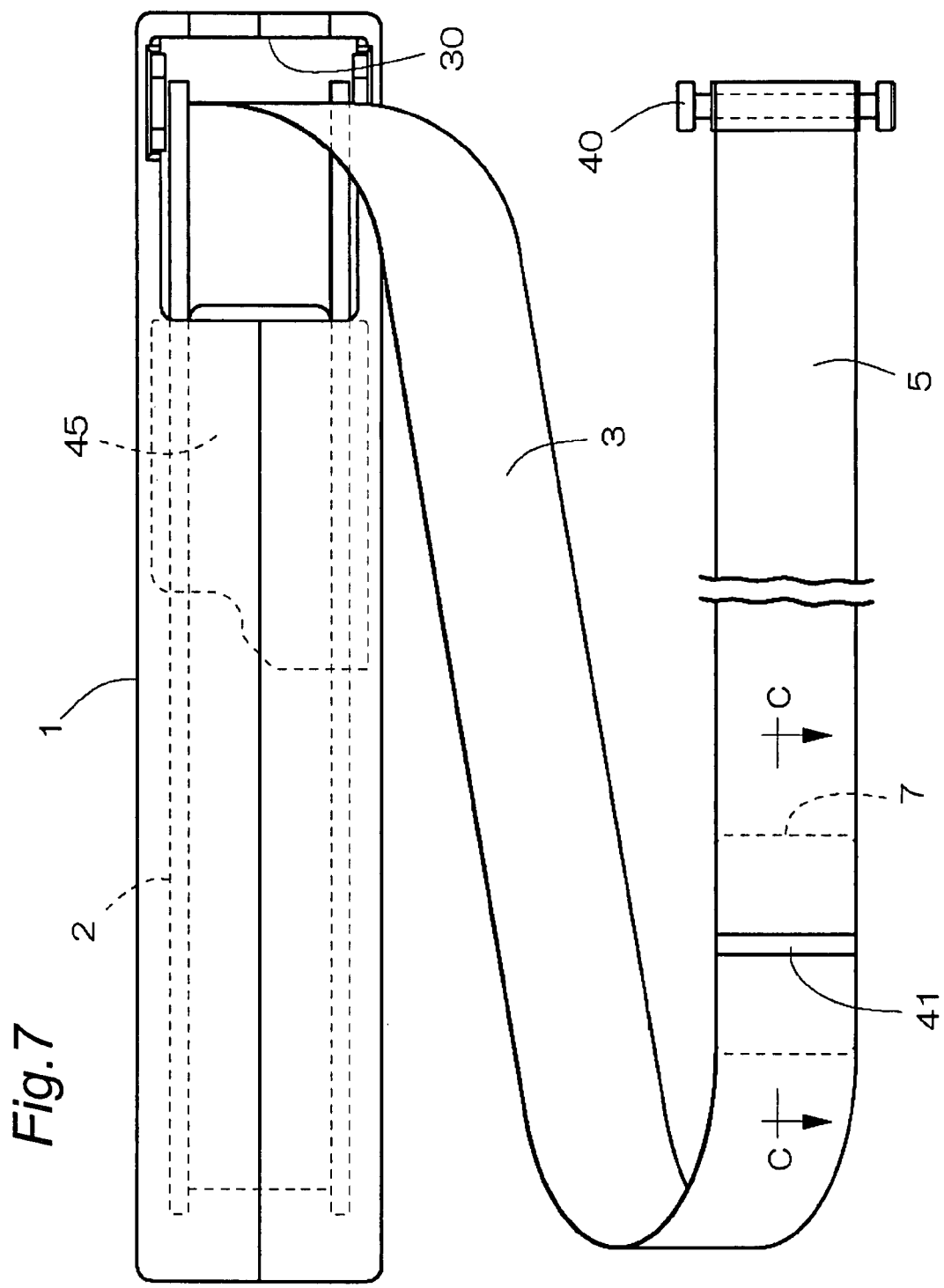
FIG. 7 is a front view showing the tape cartridge of an embodiment 2 with the tape pulled out therefrom.
Figure 8:
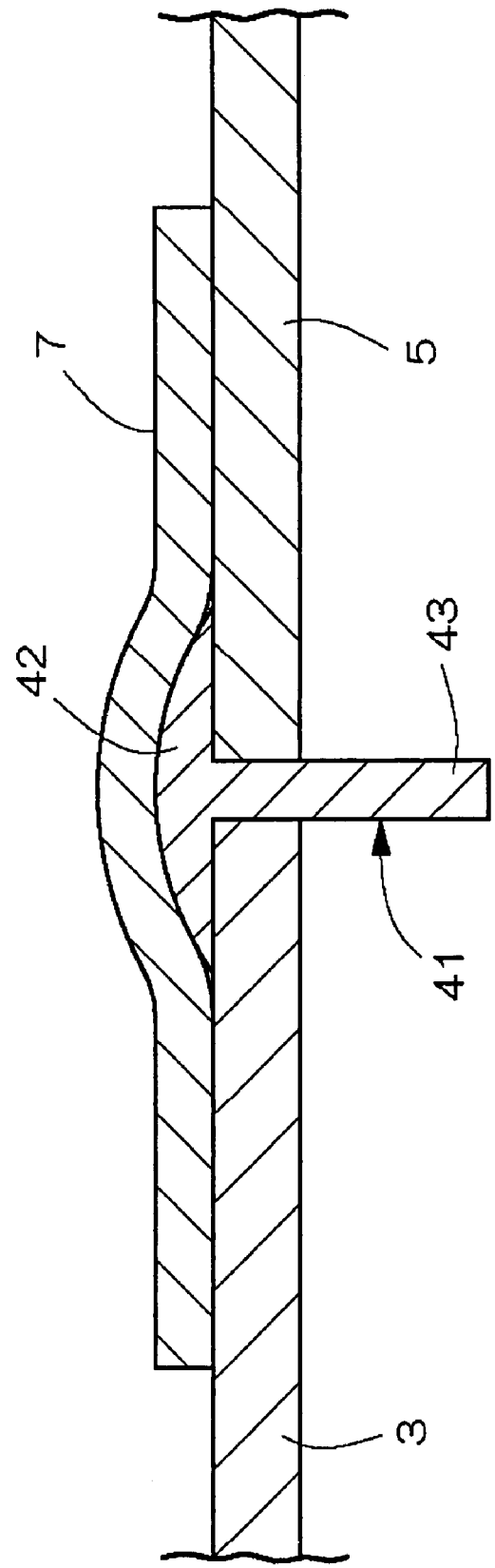
FIG. 8 is a cross sectional view taken along line C-C in FIG. 7.

In a tape cartridge of an embodiment 2, the leader block 6 is replaced with, as shown in FIG. 7, a pin 40 placed at the leading edge of the leader tape 5 so as to be captured by a capture means of the tape drive 9. As shown in FIGS. 7 and 8, a cleaning body 41 is placed between the leading end of the recording tape 3 and the starting end of the leader tape 5. It is to be noted that the leading end of the recording tape 3 may be constituted of an unrecordable tape, and may be constituted of a cleaning tape and the like.

The cleaning body 41 is made of a material such as conductive polyester resin plate materials, which can bend elastically and have flexibility to some extent, and is formed to have a T-shaped cross section. The cleaning body 41 has a base section 42 fixed to the leader tape 5 and the leading end of the recording tape 3 with a splicing tape 7, and a cleaning member 43 placed in a protruding manner protruding from the center of the base section 42 through between the leading end of the recording tape 3 and the leader tape 5. In short, the leader tape 5, the leading end of the recording tape 3 and the cleaning body 41 are integrally connected with the splicing tape 7.

In the tape loading system, upon loading of the tape cartridge of the embodiment 2 onto the tape drive 9, the pin 40 is captured by the capture means of the tape drive 9 and is unreeled from the case body 1 of the tape cartridge together with the recording tape 3 and others. When the recording tape 3 is taken up by the take up reel 35 of the tape drive 9 through the loading path 33, the cleaning member 43 of the cleaning body 41 slides in the state of being in contact with the surface of the head 20, as a result of which the contamination on the surface of the head 20 is removed. Also when the recording tape 3 is taken up by the reel 2 of the tape cartridge, the cleaning member 43 slides in the state of being in contact with the surface of the head 20, as a result of which the contamination on the surface of the head 20 is removed.

A tape outlet 30 of the case body 1 can be opened and closed with a slide door 47. Since other structural aspects are similar to those in the embodiment 1, description thereof will be omitted.

Although the present invention has been fully described by way of examples with reference to the accompanying drawings, it is to be noted that various changes and modifications will be apparent to those skilled in the art. Therefore, unless otherwise such changes and modifications depart from the spirit and the scope of the present invention, they should be construed as being included therein.

What is claimed is:

1. A tape loading system including a tape cartridge having a tape which is unreeled from a case body housing the tape and is taken up by a take up reel of an external unit through a loading path of the external unit; comprising a cleaning member which can bend elastically and which is placed at a leading end of the tape in a protruding manner and, wherein the cleaning member moves in a state of being in contact with a head placed along the loading path upon unreeling of the tape, so that the head is cleaned, wherein a leader tape is connected to the leading end of the tape in such a manner that the cleaning member is sandwiched between the leading end of the tape and the trailing end of the leader tape, and wherein the leader tape, the leading end of the tape, and the cleaning member are integrally connected with a splicing tape.

2. The tape loading system according to claim 1,
wherein one reel is housed in the case body, with the tape being wound around the reel, and
wherein the tape is a recording tape from which a signal is read by the head or which a signal is recorded by the head.

3. The tape loading system according to claim 1, wherein the cleaning member is a brush having elasticity.

* * * * *

UNITED STATES PATENT AND TRADEMARK OFFICE
CERTIFICATE OF CORRECTION

| | | |
|---|---|---|
| PATENT NO. | : 7,965,469 B2 | Page 1 of 1 |
| APPLICATION NO. | : 11/878432 | |
| DATED | : June 21, 2011 | |
| INVENTOR(S) | : Yasuo Inugai et al. | |

It is certified that error appears in the above-identified patent and that said Letters Patent is hereby corrected as shown below:

ON THE TITLE PAGE:

At item (73) Assignee, change "Hitachi Maxwell, Ltd., Ibaraki-shi, Osaka (JP)" to --Hitachi Maxell, Ltd., Ibaraki-shi, Osaka (JP)--.

Signed and Sealed this
Fourth Day of October, 2011

David J. Kappos
*Director of the United States Patent and Trademark Office*